(12) United States Patent
Yao et al.

(10) Patent No.: US 10,220,952 B2
(45) Date of Patent: Mar. 5, 2019

(54) NACELLE FOR AN AIRCRAFT AFT FAN (71) Applicant: General Electric Company, Schenectady, NY (US)

(72) Inventors: Jixian Yao, Niskayuna, NY (US); Nikolai N. Pastouchenko, Glenville, NY (US); Ivan Malcevic, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 365 days.

(21) Appl. No.: 15/245,286

(22) Filed: Aug. 24, 2016

(65) Prior Publication Data

US 2018/0057181 A1    Mar. 1, 2018

(51) Int. Cl.
*B64D 29/04* (2006.01)
*B64C 21/06* (2006.01)
*B64D 27/20* (2006.01)
*B64D 27/24* (2006.01)

(52) U.S. Cl.
CPC .............. *B64D 29/04* (2013.01); *B64C 21/06* (2013.01); *B64D 27/20* (2013.01); *B64D 27/24* (2013.01); *B64C 2230/04* (2013.01)

(58) Field of Classification Search
CPC ........ B64D 29/04; B64D 27/24; B64D 27/20; B64C 21/06; B64C 2230/04
See application file for complete search history.

(56) References Cited

U.S. PATENT DOCUMENTS

| | | | |
|---|---|---|---|
| 2,477,637 A | 8/1949 | Mercier | |
| 3,109,610 A | 11/1963 | Quenzler et al. | |
| 3,286,470 A * | 11/1966 | Gerlaugh | B64D 27/20 244/15 |
| 3,463,421 A | 8/1969 | Pyptiuk | |
| 4,220,171 A | 9/1980 | Ruehr et al. | |
| 5,915,403 A | 6/1999 | McConachie et al. | |
| 6,793,175 B1 | 9/2004 | Sanders et al. | |
| 7,334,447 B1 | 2/2008 | Kulkarni et al. | |
| 7,819,358 B2 * | 10/2010 | Belleville | B64C 11/001 244/52 |
| 7,967,241 B2 | 6/2011 | Chase et al. | |

(Continued)

FOREIGN PATENT DOCUMENTS

| | | |
|---|---|---|
| DE | 1 531 364 A1 | 2/1970 |
| EP | 2 998 225 A1 | 3/2016 |
| EP | 3 048 042 A1 | 7/2016 |

OTHER PUBLICATIONS

Extended European Search Report and Opinion issued in connection with corresponding EP Application No. 17187525.5 dated Jan. 17, 2018.

(Continued)

*Primary Examiner* — Brian M O'Hara (74) *Attorney, Agent, or Firm* — GE Global Patent Operation; Nitin Joshi (57) ABSTRACT

An aircraft is provided including a fuselage extending between a forward end and an aft end. An aft engine is mounted to the aft end of the fuselage and defines a centerline. The aft engine further includes a nacelle having a forward transition duct at the forward end of the nacelle. The forward transition duct also defines a centerline and the centerline of the forward transition duct is angled downward relative to the centerline of the aft engine.

19 Claims, 6 Drawing Sheets

(56) References Cited

U.S. PATENT DOCUMENTS

| | | |
|---|---|---|
| 8,197,191 B2 | 6/2012 | Binks et al. |
| 8,333,076 B2 | 12/2012 | Conners et al. |
| 9,245,089 B1 | 1/2016 | Nark et al. |
| 2015/0129045 A1 | 5/2015 | Kane et al. |

OTHER PUBLICATIONS

Bell R A et al., "An inverse method for the aerodynamic design of three-dimensional aircraft engine nacelles", Aircraft Design, Testing and Performance, NASA Technical Reports Server (NTRS), pp. 405-417, Jan. 1, 1991.

\* cited by examiner

NACELLE FOR AN AIRCRAFT AFT FAN

FIELD OF THE INVENTION

The present subject matter relates generally to an aft engine for an aircraft propulsion system, and more particularly to a nacelle for the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft, including the turbofan jet engines, also has an effect on the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reducing an overall drag on the aircraft by reenergizing a boundary layer airflow over the aft end of the fuselage. The inventors of the present disclosure have discovered that increasing an amount of relatively low momentum boundary layer air ingested by the fan at the aft end can increase an efficiency of the aft fan. Accordingly, an aft fan configured to maximize an amount of relatively low momentum boundary layer air ingested would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal direction is provided. The aircraft includes a fuselage extending between a forward end and an aft end along the longitudinal direction of the aircraft. The aircraft additionally includes an aft engine mounted to the aft end of the fuselage and defining a centerline. The aft engine further includes a nacelle including a forward transition duct at a forward end of the nacelle, the forward transition duct defining a centerline. The centerline of the forward transition duct is angled downward relative to the centerline of the aft engine.

In another exemplary embodiment of the present disclosure, a propulsion system for an aircraft is provided. The aircraft defines a vertical direction and includes a fuselage having an aft end. The propulsion system includes an aft engine configured to be mounted to the aft end of the fuselage and defining a centerline. The aft engine further includes a nacelle including a forward transition duct at a forward end of the nacelle. The forward transition duct defines a centerline. The centerline of the forward transition duct is angled downward along the vertical direction relative to the centerline of the aft engine when mounted to the fuselage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a propulsion system and an aircraft including the same. The propulsion system generally includes an aft engine mounted to an aft end of a fuselage of the aircraft. The aft engine may be configured to ingest and re-energize a flow of boundary layer air over the aft end of the fuselage. The aft engine generally includes a nacelle having a forward transition duct at a forward end of the nacelle. The forward transition duct defines a centerline, with the centerline of the forward transition duct angled downward relative to a centerline of the aft engine. Such a configuration may assist the aft engine with more efficiently ingesting relatively low momentum boundary layer airflow over the aft end of the aircraft. Specifically, given a geometry of the aft end of the fuselage, the boundary layer airflow over a bottom side of the fuselage may have a relatively low momentum as compared to the airflow over a top side of the fuselage. By orienting the forward transition duct downwardly, the aft engine may more efficiently ingest the relatively low momentum boundary layer airflow to increase an overall efficiency of the aft engine.

Figure 1:
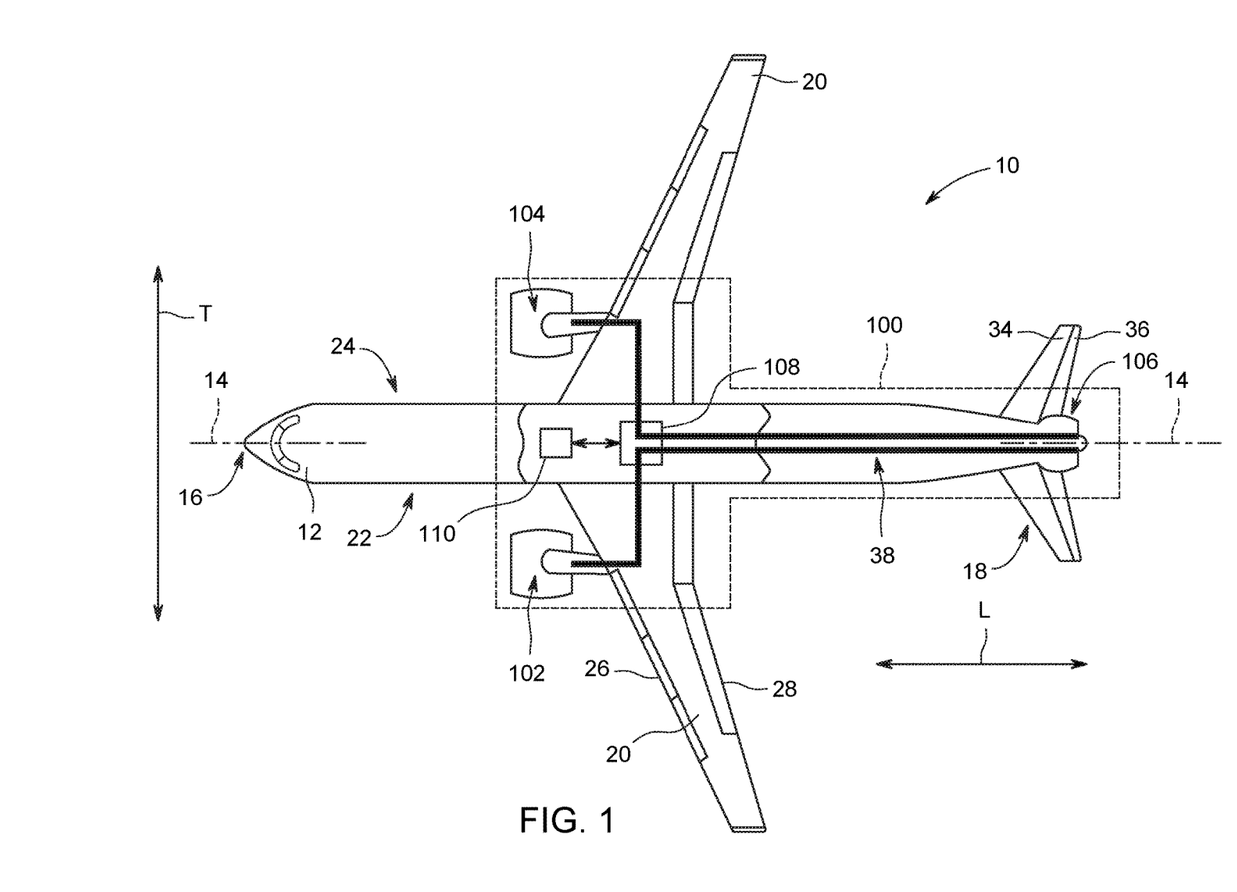
FIG. 1 is a top view of an aircraft according to various exemplary embodiments of the present disclosure.
Figure 2:
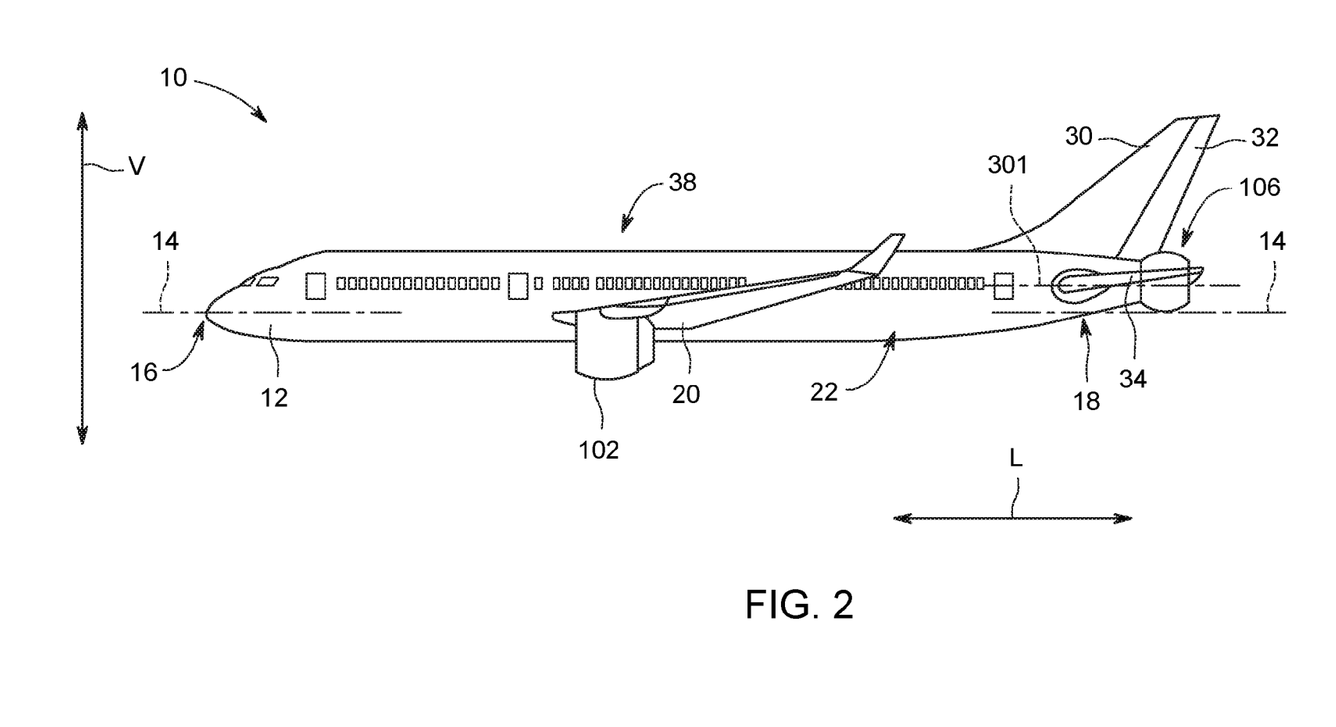
FIG. 2 is a port side view of the exemplary aircraft of FIG. 1

Referring now to the drawings, wherein identical numerals indicate the same elements throughout the figures, FIG. 1 illustrates a top view of one embodiment of the aircraft 10 according to the present disclosure. FIG. 2 illustrates a port side view of the aircraft 10 as illustrated in FIG. 1. As shown in FIGS. 1 and 2 collectively, the aircraft 10 defines a longitudinal centerline 14 that extends therethrough, a vertical direction V, a transverse direction T, and a longitudinal direction L.

Moreover, the aircraft 10 includes a fuselage 12, extending longitudinally between a forward end 16 and an aft end 18, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/transverse direction T.

In addition, the aircraft 10 of FIGS. 1 and 2 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. Further, as shown in FIG. 2, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18 of the fuselage 12, such that the BLI fan 106 is incorporated into or blended with a tail section at the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
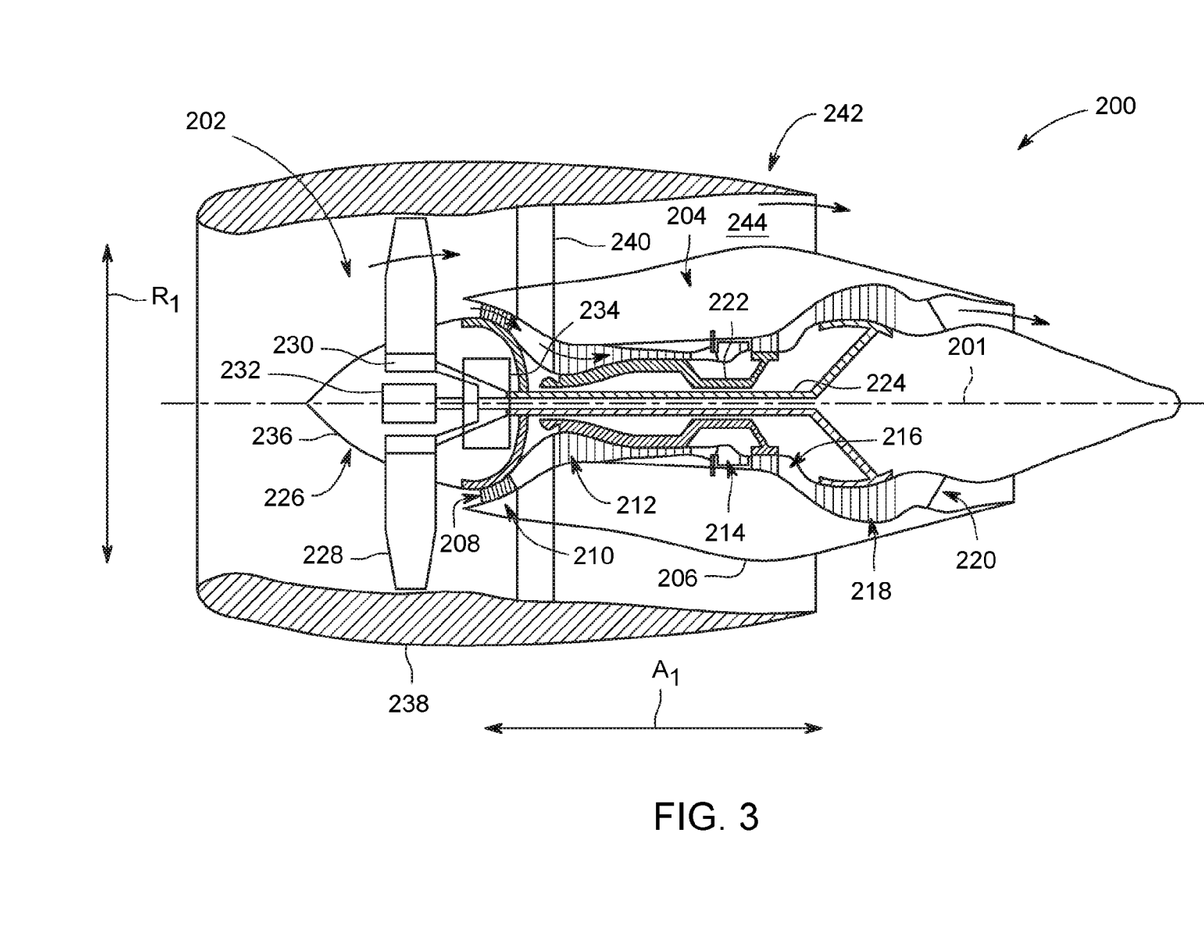
FIG. 3 is a schematic, cross-sectional view of an aft engine in accordance with an exemplary embodiment of the present disclosure.

Referring now to FIG. 3, in certain embodiments, the jet engines 102, 104 may be configured as high-bypass turbofan jet engines. More specifically, FIG. 3 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. It should be appreciated, that as used herein, terms of approximation, such as "approximately," "generally," "substantially," or "about," refer to being within a ten percent margin of error. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 includes a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228, e.g., in unison. As such, the fan blades 228, the disk 230, and the actuation member 232 are together rotatable about the longitudinal axis 12 by LP shaft 224 across, for the embodiment depicted, a power gearbox 234. In certain embodiments, the power gearbox 234 includes a plurality of gears for stepping down the rotational speed of the LP shaft 224 to a more efficient rotational fan speed.

Referring still to FIG. 3, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. The outer nacelle 238 is supported relative to the core turbine engine 204 by a plurality of circumferentially-spaced outlet guide vanes 240. Moreover, a downstream section 242 of the nacelle 238 extends over an outer portion of the core turbine engine 204 so as to define a bypass airflow passage 244 therebetween.

It should be appreciated, however, that the turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turbojet engine or turboprop engine.

Figure 4:
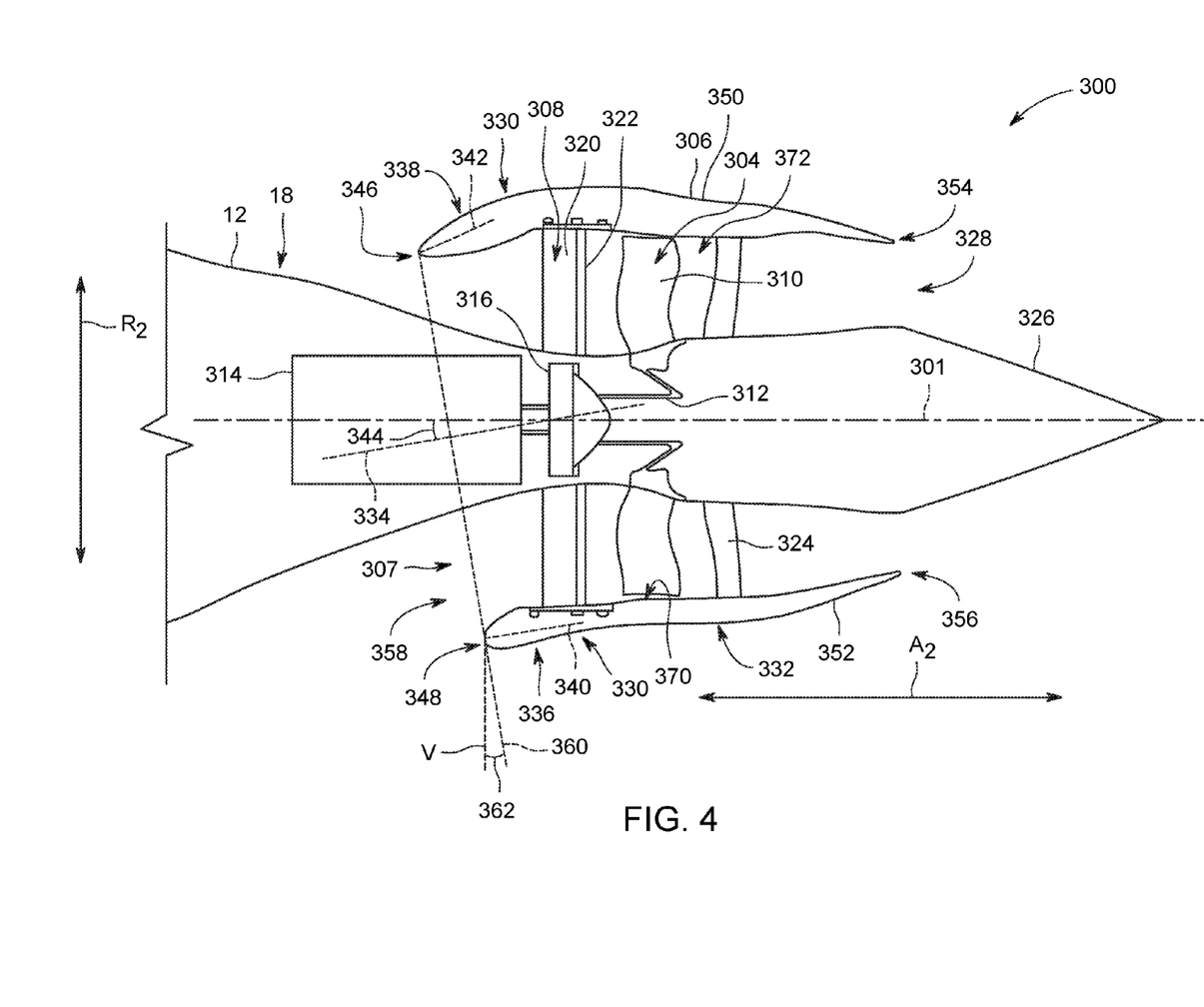
FIG. 4 is a schematic, cross-sectional view of an aft engine in accordance with an exemplary embodiment of the present disclosure.

Referring now to FIG. 4, a schematic, cross-sectional side view of an aft engine in accordance with various embodiments of the present disclosure is provided. More specifically, as shown, the aft engine is configured as a boundary layer ingestion (BLI) fan 300 mounted to an aft end 18 of a fuselage 12 of an aircraft 10. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

More specifically, as shown, the BLI fan 300 defines an axial direction $A_2$ extending along a centerline 301 of the BLI fan 300, which for the embodiment depicted is the same as the central axis 15. Additionally, the BLI fan 300 defines a radial direction $R_2$ and a circumferential direction $C_2$ (i.e., a direction extending about the axial direction $A_2$; see FIG. 6). In general, the BLI fan 300 includes a fan 304 rotatable about the centerline 301, a nacelle 306 extending around at least a portion of the fan 304, and one or more structural members extending between the nacelle 306 and the fuselage 12 of the aircraft 10. In certain embodiments, the one or more structural members may be configured as one or more inlet guide vanes 308 and/or as one or more outlet guide vanes 324. Notably, as used herein, the term "fuselage" includes an inner surface of the BLI fan 300 even though in certain embodiments, the inner surface of the BLI fan 300 may be formed with the BLI fan 300 and mounted to, e.g., a bulkhead (not shown) within the fuselage 12 of the aircraft 10 as a unit.

Further, the fan 304 includes a plurality of fan blades 310 spaced generally along the circumferential direction $C_2$. Moreover, where present, the inlet guide vanes 308 extend between the nacelle 306 and the fuselage 12 of the aircraft 10 at a location forward of the plurality of fan blades 310. More specifically, as shown, the inlet guide vanes 308 generally extend substantially along the radial direction $R_2$ of the BLI fan 300 between the nacelle 306 and the fuselage 12 of the aircraft 10 for mounting the BLI fan 300 to the fuselage 12 of the aircraft 10. In addition, the inlet guide vanes 308 may spaced substantially evenly along the circumferential direction $C_2$ of the BLI fan 300, or in any other suitable manner.

Further, the inlet guide vanes 308 may be shaped and/or oriented to direct and/or condition a flow of air into the BLI fan 300 to, e.g., increase an efficiency of the BLI fan 300, or reduce a distortion of the air flowing into the BLI fan 300. In addition, it should be understood that the inlet guide vanes 308 may be configured as fixed inlet guide vanes extending between the nacelle 306 and the fuselage 12 of the aircraft 10. Alternatively, the inlet guide vanes 308 may be configured as variable inlet guide vanes. For example, as shown in FIG. 4, the inlet guide vanes 308 include a body 320 and a tail flap 322. The body 320 is fixed relative to the nacelle 306 of the BLI fan 300 and the flap 322 is configured to rotate about a substantially radial axis. By rotating the flap 322 between various positions, the inlet guide vanes 308 may be configured to vary a direction in which air flowing thereover is directed.

As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, for the embodiment depicted, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. Accordingly, in certain embodiments, the BLI fan 300 may be an electric fan. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

Referring still to FIG. 4, the BLI fan 300 may also additionally include one or more outlet guide vanes 324 and a tail cone 326. As shown in the illustrated embodiment, the outlet guide vanes 324 extend between the nacelle 306 and the tail cone 326 for directing a flow of air through the BLI fan 300, and optionally for adding strength and rigidity to the BLI fan 300. Further, the outlet guide vanes 324 may be evenly spaced along the circumferential direction $C_2$ or may have any other suitable spacing. Additionally, the outlet guide vanes 324 may be fixed outlet guide vanes, or alternatively may be variable outlet guide vanes. Inclusion of the plurality of outlet guide vanes 324 extending between the nacelle 306 and the tail cone 326 may allow for, e.g., tighter clearances between the plurality of fan blades 310 and the nacelle 306, such that an efficiency of the BLI fan 300 may be maximized.

Further, aft of the plurality of fan blades 310, and for the embodiment depicted, aft of the one or more outlet guide vanes 324, the BLI fan 300 additionally defines a nozzle 328 between the nacelle 306 and the tail cone 326. As such, the nozzle 328 may be configured to generate an amount of thrust from the air flowing therethrough. In addition, the tail cone 326 may be shaped to minimize an amount of drag on the BLI fan 300. However, in other embodiments, the tail cone 326 may have any other shape and may, e.g., end forward of an aft end of the nacelle 306 such that the tail cone 326 is enclosed by the nacelle 306 at an aft end. Additionally, in other embodiments, the BLI fan 300 may not be configured to generate any significant amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring still to FIG. 4, the nacelle 306 extends around and encircles the plurality of fan blades 310, and also extends around the fuselage 12 of the aircraft 10 at the aft end 18 of the fuselage 12 when, as shown in FIG. 4, the BLI fan 300 is mounted to the fuselage 12. Notably, as used herein, the term "nacelle" includes the nacelle as well as any structural fan casing or housing. The nacelle 306 generally includes a forward transition duct 330 positioned at a forward end of the nacelle 306 and a main, body portion 332 of the nacelle 306. The forward transition duct 330 is a fixed (immovable) portion of the nacelle 306 configured to maximize an amount of relatively low momentum boundary layer airflow ingested by the BLI fan 300.

The forward transition duct 330 defines a centerline 334, and the centerline 334 of the forward transition duct 330 is angled downward relative to the centerline 301 of the BLI fan 300. More specifically, the forward transition duct 330 includes a bottom section 336 and a top section 338, which for the embodiment depicted are configured as a bottommost section and a top-most section, respectively, along the vertical direction V (see FIG. 2). The bottom section 336 of the forward transition duct 330 defines a bottom camber line 340 and the top section 338 of the forward transition duct 330 defines a top camber line 342. The centerline 334 of the forward transition duct 330 of the nacelle 306 is configured as a midpoint line between the top camber line 342 of the top section 338 and the bottom camber line 340 of the bottom section 336 (i.e., a straight line that is an average distance between the top and bottom camber lines 342, 340). Notably, for the embodiment depicted, the top camber line 342 of the top section 338 of the forward transition duct 330 and the bottom camber line 340 of the bottom section 336 of the forward transition duct 330 are within about five degrees (5°) of being parallel to one another. For example, in certain embodiments, the top camber line 342 may be within about three degrees (3°) of being parallel to the bottom camber line 340.

Additionally, referring still to FIG. 4, as stated, the centerline 334 of the forward transition duct 330 is angled downwardly relative to the centerline 301 of the BLI fan 300. More specifically, for the embodiment depicted, the centerline 334 of the forward transition duct 330 defines an angle 344 greater than or equal to about ten degrees (10°) with the centerline 301 of the BLI fan 300. For example, in certain embodiments, the centerline 334 of the forward transition duct 330 may define an angle 344 greater than or equal to about fifteen degrees (15°) with the centerline 301 of the BLI fan 300.

Moreover, for the exemplary embodiment depicted, the top section 338 of the nacelle 306 extends farther forward than the bottom section 336 of the nacelle 306. More specifically, the bottom section 336 of the forward transition duct 330 defines a forward edge 346, and similarly, the top section 338 of the forward transition duct 330 defines a forward edge 348. The forward edge 346 of the top section 338 is positioned farther forward than the forward edge 348 of the bottom section 336 along the longitudinal direction L and along the centerline 301 of the BLI fan 300. As is also depicted, the body portion 332 of the nacelle 306 also includes a top section 350 and a bottom section 352. The top and bottom sections 350, 352 of the body portion 332 of the nacelle 306 each define an aft edge 354, 356, respectively. The aft edges 354, 356 of the top and bottom sections 350, 352 of the body portion 332 of the nacelle 306 are positioned approximately at the same location along the centerline 301 of the BLI fan 300 and along the longitudinal direction L. Accordingly, for the embodiment depicted, a top length (along the respective camber lines) between the forward edge 346 of the top section 338 of the forward transition duct 330 and the aft edge 354 of the top section 350 of the body portion 332 of the nacelle 306 is greater than a bottom length (along the respective camber lines) between the forward edge 348 of the bottom section 336 of the forward transition duct 330 and the aft edge 358 of the bottom section 352 of the body portion 332 of the nacelle 306. For example, in certain exemplary embodiments, the top length may be at least about five percent (5%) larger than the bottom length, such as at least about ten percent (10%) larger than the bottom length.

As is also depicted, the forward transition duct 330 of the nacelle 306 defines an inlet 358 to the BLI fan 300, the inlet 358 being defined between the forward transition duct 330 and the fuselage 12 of the aircraft 10. As mentioned above, the nacelle 306 of the BLI fan 300 extends around the fuselage 12 of the aircraft 10 at the aft end 18 of the fuselage 12. Accordingly, as shown more clearly below with respect to FIG. 5, the inlet 358 of the BLI fan 300 extends substantially three hundred sixty degrees (360°) around the fuselage 12 of the aircraft 10 when, such as in the embodiment depicted, the BLI fan 300 is mounted to the aircraft 10. The forward transition duct 330 further defines an inlet line 360 between the forward edges 346, 348. Given the relative positions of the forward edge 346 of the top section 338 of the forward transition duct 330 and the forward edge 348 of the bottom section 336 of the forward transition duct 330, the inlet line 360 defines an angle 362 with the vertical direction V. For the embodiment depicted, the inlet line 360 defines an angle 362 of at least about ten degrees (10°) with the vertical direction V. For example, in certain embodiments, the inlet line 360 may define an angle 362 of at least about fifteen degrees (15°) with the vertical direction V.

Figure 5:
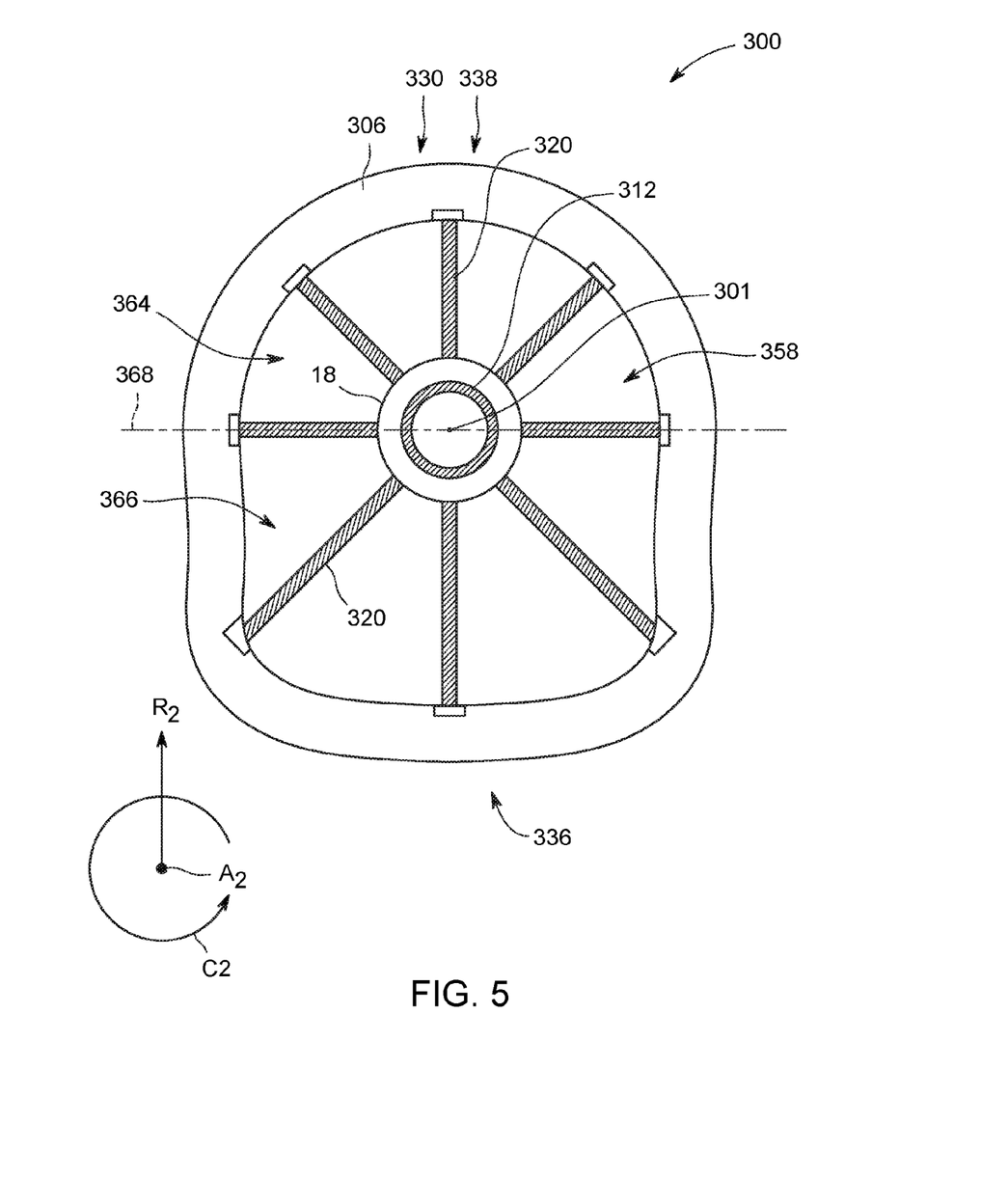
FIG. 5 is a forward-looking-aft view of the exemplary aft engine of FIG. 4.

Moreover, referring briefly now also to FIG. 5, providing a forward-looking-aft view of the inlet 358 to the BLI fan 300, the inlet 358 to the BLI fan 300 defines a non-axisymmetric shape. The inventors of the present disclosure have discovered that a momentum of the boundary layer air flowing into the BLI fan 300 may be less at a bottom side of the fuselage 12 as compared to the top side of the fuselage 12, especially given a greater slope of a surface of the fuselage 12 at the bottom side relative to the top side. Accordingly, the inlet 358 defined by the nacelle 306 with the fuselage 12 of the aircraft 10 may define a non-axis symmetric shape with respect to the centerline 301 of the BLI fan 300. For example, the inlet 358, which extends substantially three hundred and sixty degrees (360°) around the fuselage 12, includes a top half 364 positioned above the centerline 301 and a bottom half 366 positioned below the centerline 301. The top and bottom halves 364, 366 of the inlet 358 are depicted separated by a horizontal reference line 368 extending through the centerline 301. Moreover, the top half 364 of the inlet 358 defines a top half inlet area and the bottom half 366 of the inlet 358 defines a bottom half inlet area. The bottom half inlet area is greater than the top half inlet area, such that the inlet 358 may be configured to capture a desired amount of the boundary layer air flowing over the bottom side of the fuselage 12 with less momentum. For example, in certain embodiments, the bottom half inlet area may be at least about ten percent (10%) greater than the top half inlet area.

Referring again to FIG. 4, the body portion 332 of the nacelle 306, positioned aft of the forward transition duct 330, additionally includes a diffusion section 370. The diffusion section 370 is positioned aft of the forward transition duct 330 and at least partially forward of the plurality of fan blades 310. The diffusion section 370 may provide for an increase in the cross-sectional area of an airflow passage 372 defined between the outer nacelle 306 and the fuselage 12 in order to reduce a distortion of the airflow through the airflow passage 372. The distortion may be generated at least in part due to the shape of the forward transition duct 330 and inlet 358 defined thereby. It should be appreciated that the nacelle 306 may further include other features not depicted for reducing a distortion of an airflow ingested by the BLI fan 300. For example, the nacelle 306 may include an interior surface having a plurality of dimples or other indentations or features for reducing a distortion.

An aft-mounted, BLI fan 300 including a nacelle 306 having a forward transition duct 330 formed in accordance with one or more the exemplary embodiments of the present disclosure may allow for the BLI fan 300 to more efficiently reduce an overall drag on the aircraft. More specifically, inclusion of a nacelle 306 having a forward transition duct 330 in accordance with one or more of the exemplary embodiments the present disclosure may allow for the BLI fan 300 to ingest more relatively low momentum boundary layer air flowing over a bottom side of the fuselage 12 at the aft end 18 of the fuselage 12, as compared to the relatively high momentum boundary layer air flowing over a top side of the fuselage 12 at the aft end 18 of the fuselage 12. As will be appreciated, such may be accomplished at least in part due to the orientation of the forward transition duct 330 being downward relative to the centerline 334 of the aft engine in order to target the airflow flowing over the bottom side of the fuselage 12 at the aft end 18 of the fuselage 12.

It should be appreciated, however, that in other embodiments, the outer nacelle 306, and more specifically, the forward transition duct 330 may have any other suitable shape and/or may include any other suitable features for increasing an amount of boundary layer air ingested by the BLI fan 300. For example, referring now to FIG. 6, a schematic, cross-sectional side view of an aft engine in accordance with another embodiment of the present disclosure is provided. The exemplary aft engine of FIG. 6 may be configured in substantially the same manner as the exemplary aft engine of FIG. 5. Accordingly, the same or similar numbers may refer to the same or similar part.

Figure 6:
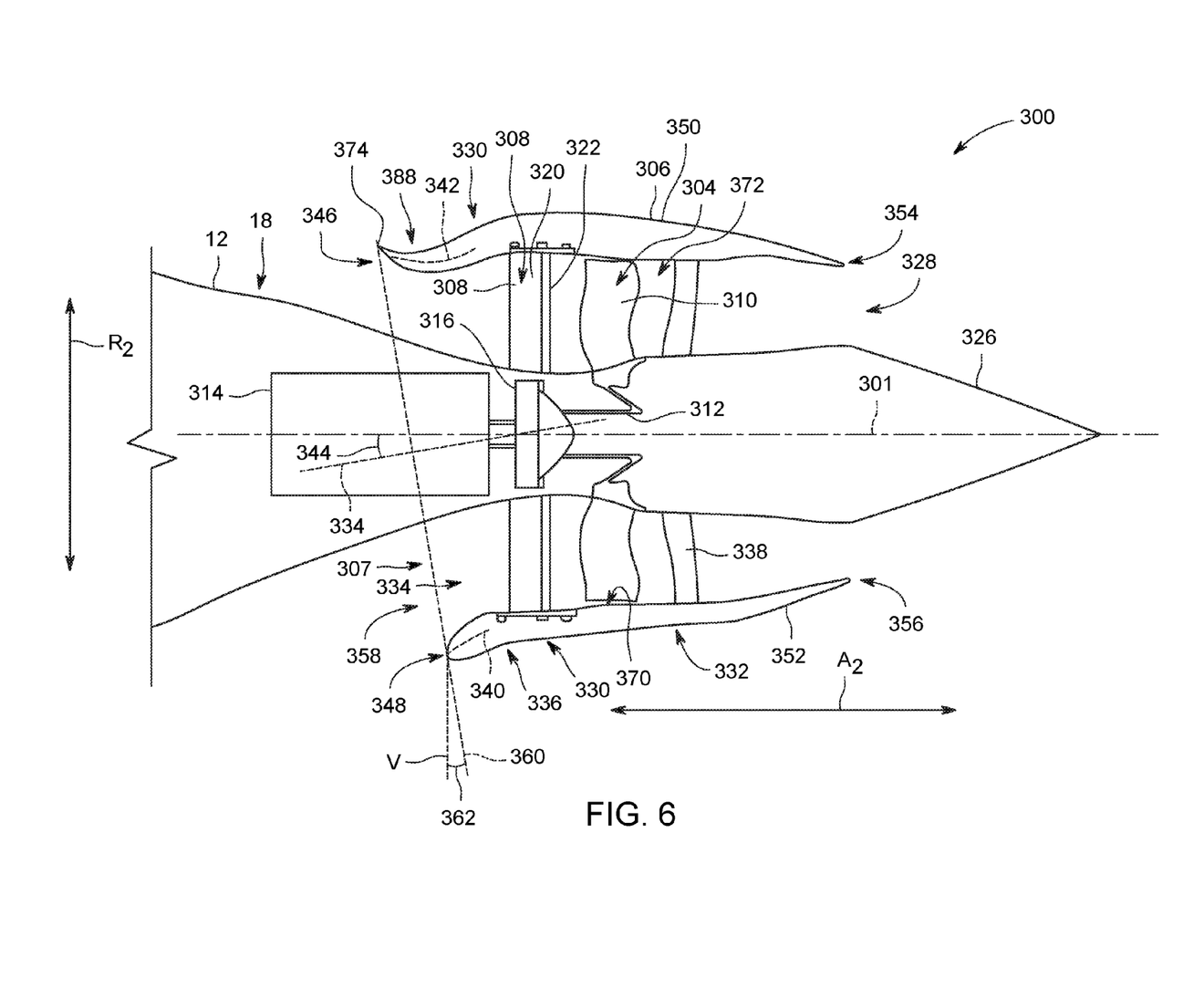
FIG. 6 is a schematic, cross-sectional view of an aft engine in accordance with another exemplary embodiment of the present disclosure.

For example, the aft engine of FIG. 6 is generally configured as a BLI fan 300 defining a centerline 301 and including a fan section 304 having a plurality of fan blades 310 rotatable by a power source 314, such as an electric motor, across a power gearbox 316. Additionally, the BLI fan 300 includes a nacelle 306 extending around the plurality of fan blades 310, and around the fuselage 12 of the aircraft 10. The nacelle 306 further includes a forward transition duct 330 defining a centerline 334, with the centerline 334 of the forward transition duct 330 angled downward relative to the centerline 301 of the BLI fan 300. However, for the embodiment depicted, a top section 338 of the forward transition duct 330 further includes a feature for directing boundary layer air over a top side of the fuselage 12 of the aircraft 10 at the aft end of the aircraft 10 into the BLI fan 300. More specifically, the top section 338 of the forward transition duct 330 of the exemplary nacelle 306 depicted in FIG. 6 includes a curved inlet lip 374 positioned at a forward end of the top section 338 of the forward transition duct 330. The curved inlet lip 374 extends away from the centerline 334 of the forward transition duct 330 in order to direct an increased amount of boundary layer air over the top side of the fuselage 12 of the aircraft 10 into the BLI fan 300.

Still other embodiments of the exemplary nacelle 306 depicted in the Figures and described herein may have any other suitable shape or configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction and comprising:
    a fuselage extending between a forward end and an aft end along the longitudinal direction of the aircraft; and
    an aft engine mounted to the aft end of the fuselage and defining a centerline, the aft engine further comprising a nacelle comprising a forward transition duct at a forward end of the nacelle, the forward transition duct defining a centerline, the centerline of the forward transition duct angled downward relative to the centerline of the aft engine;
    wherein the aft engine is a boundary layer ingestion aft engine.

2. The aircraft of claim 1, wherein the forward transition duct of the nacelle includes a bottom section and a top section, wherein the bottom section and the top section each define a camber line, and wherein the centerline of the transition duct of the nacelle is a midpoint line between the camber line of the top section and the camber line of the bottom section.

3. The aircraft of claim 2, wherein the camber line of the top section of the forward transition duct and the camber line of the bottom section of the forward transition duct are within about five degrees of being parallel to one another.

4. The aircraft of claim 1, wherein the centerline of the forward transition duct defines an angle greater than or equal to about ten degrees with the centerline of the aft engine.

5. The aircraft of claim 1, wherein the forward transition duct of the nacelle includes a bottom section and a top section, wherein the bottom section of the forward transition duct defines a forward edge, wherein the top section of the forward transition duct defines a forward edge, and wherein the forward edge of top section is positioned farther forward than the forward edge of the bottom section along the longitudinal direction.

6. The aircraft of claim 5, wherein the top section of the forward transition duct comprises a curved inlet lip extending away from the centerline of the forward transition duct.

7. The aircraft of claim 5, wherein the aircraft defines a vertical direction, wherein the forward transition duct defines an inlet line, and wherein the inlet line defines an angle of at least about ten degrees with the vertical direction.

8. The aircraft of claim 1, wherein the nacelle further comprises a diffusion section positioned aft of the forward transition duct.

9. The aircraft of claim 1, wherein the centerline of the aft engine extends parallel to the longitudinal direction of the aircraft.

10. The aircraft of claim 1, wherein the nacelle defines an inlet having a top half positioned above the centerline of the aft engine and a bottom half positioned below the centerline of the aft engine, wherein the top half of the inlet defines a top half inlet area, wherein the bottom half of the inlet defines a bottom half inlet area, and wherein the bottom half inlet area is greater than the top half inlet area.

11. The aircraft of claim 1, wherein the aft engine is an electric fan.

12. The aircraft of claim 1, wherein the forward transition duct is a fixed portion of the nacelle.

13. A propulsion system for an aircraft, the aircraft defining a vertical direction and comprising a fuselage defining an aft end, the propulsion system comprising:
an aft engine configured to be mounted to the aft end of the fuselage and defining a centerline, the aft engine further comprising a nacelle including a forward transition duct at a forward end of the nacelle, the forward transition duct defining a centerline, the centerline of the forward transition duct angled downward along the vertical direction relative to the centerline of the aft engine when mounted to the fuselage;
wherein the aft engine is a boundary layer ingestion aft engine.

14. The propulsion system of claim 13, wherein the forward transition duct of the nacelle includes a bottom section and a top section, wherein the bottom section and the top section each define a camber line, and wherein the centerline of the transition duct of the nacelle is a midpoint line between the camber line of the top section and the camber line of the bottom section.

15. The propulsion system of claim 13, wherein the centerline of the forward transition duct defines an angle greater than or equal to about ten degrees with the centerline of the aft engine.

16. The propulsion system of claim 13, wherein the forward transition duct of the nacelle includes a bottom section and a top section, wherein the bottom section of the forward transition duct defines a forward edge, wherein the top section of the forward transition duct defines a forward edge, and wherein the forward edge of top section is positioned farther forward than the forward edge of the bottom section along the longitudinal direction.

17. The propulsion system of claim 16, wherein the forward transition duct defines an inlet line, and wherein the inlet line defines an angle of at least about ten degrees with the vertical direction.

18. The propulsion system of claim 13, wherein the nacelle defines an inlet having a top half positioned above the centerline of the aft engine and a bottom half positioned below the centerline of the aft engine, wherein the top half of the inlet defines a top half inlet area, wherein the bottom half of the inlet defines a bottom half inlet area, and wherein the bottom half inlet area is greater than the top half inlet area.

19. The propulsion system of claim 13, wherein the aft engine is an electric fan.

* * * * *